United States Patent
Sato

(10) Patent No.: US 9,030,777 B2
(45) Date of Patent: May 12, 2015

(54) MICROWAVE ASSISTED MAGNETIC RECORDING HEAD HAVING SPIN TORQUE OSCILLATOR, AND MAGNETIC RECORDING APPARATUS

(71) Applicant: Hitachi, Ltd., Chiyoda-ku, Tokyo (JP)

(72) Inventor: Yo Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/798,302

(22) Filed: Mar. 13, 2013

(65) Prior Publication Data
US 2013/0271866 A1    Oct. 17, 2013

(30) Foreign Application Priority Data
Apr. 17, 2012   (JP) .................................. 2012-093802

(51) Int. Cl.
G11B 5/127    (2006.01)
G11B 5/31     (2006.01)
G11B 5/147    (2006.01)
G11B 5/23     (2006.01)
G11B 5/00     (2006.01)

(52) U.S. Cl.
CPC .............. *G11B 5/147* (2013.01); *G11B 5/3143* (2013.01); *G11B 5/1278* (2013.01); *G11B 5/23* (2013.01); *G11B 5/3146* (2013.01); *G11B 2005/0024* (2013.01)

(58) Field of Classification Search
CPC ........ G11B 5/127; G11B 5/1278; G11B 5/31; G11B 5/3143
USPC .......................................... 360/125.3, 125.31
See application file for complete search history.

(56) References Cited

U.S. PATENT DOCUMENTS

| | | | | |
|---|---|---|---|---|
| 8,908,330 B1* | 12/2014 | Mallary | ...................... | 360/125.3 |
| 8,929,031 B2* | 1/2015 | Takeo et al. | ................ | 360/125.3 |
| 2008/0304176 A1* | 12/2008 | Takagishi et al. | ............... | 360/86 |
| 2012/0075752 A1* | 3/2012 | Sato et al. | ...................... | 360/324 |
| 2012/0126905 A1* | 5/2012 | Zhang et al. | ................ | 331/94.1 |
| 2013/0063840 A1* | 3/2013 | Koui et al. | .................... | 360/110 |
| 2013/0222949 A1* | 8/2013 | Braganca et al. | ........ | 360/324.11 |
| 2013/0229895 A1* | 9/2013 | Shiroishi et al. | ........... | 369/13.14 |
| 2014/0145792 A1* | 5/2014 | Wang et al. | .................. | 331/94.1 |

FOREIGN PATENT DOCUMENTS

| JP | 6-243527 | 9/1994 |
|---|---|---|
| JP | 2009-49101 | 3/2009 |

OTHER PUBLICATIONS

Kristen Buchanan, Symposium on Microwave Assisted Magnetization Reversal, Nov. 14, 2008, Salon C.
Xiaochun Zhu et al., Bias-Field-Free Microwave Oscillator Driven by Perpendicularly Polarized Spin Current, IEEE Transactions on Magnetics, Oct. 2006, pp. 2670-2672, vol. 42, No. 10.
J.C. Slonczewski, Overview of interlayer exchange theory, Journal of Magnetism and Magnetic Materials 150 (1995) 13-24.
S. Mizukami et al., Effect of spin diffusion on Gilbert damping for a very thin permalloy layer in Cu/permalloy/cu/Pt films, Physical Review B 66, 104413 (2002).
Jian-Gang (Jimmy) Zhu et al., Microwave Assisted Magnetic Recording (MAMR), Data Storage Systems Center, Carnegie Mellon University, jzhu@ece.cmu.edu.

* cited by examiner

*Primary Examiner* — Jefferson Evans
(74) *Attorney, Agent, or Firm* — Baker Botts L.L.P.

(57) ABSTRACT

A spin torque oscillator generates a strong high-frequency magnetic field stably and has high reliability. A magnetic recording head includes a main magnetic pole and a spin torque oscillator. A magnetization control layer is antiferromagnetically coupled via a non-magnetic coupling layer with an interface contacting a high-frequency magnetic field generation layer of the spin torque oscillator.

8 Claims, 5 Drawing Sheets

MICROWAVE ASSISTED MAGNETIC RECORDING HEAD HAVING SPIN TORQUE OSCILLATOR, AND MAGNETIC RECORDING APPARATUS

The present application claims priority from Japanese patent application JP 2012-093802 filed on Apr. 17, 2012, the content of which is hereby incorporated by reference into this application.

BACKGROUND

1. Technical Field

The embodiments discussed herein generally relate to a spin torque oscillator capable of stable high frequency oscillation, a magnetic recording head adapted for high magnetic recording density and having a spin torque oscillator for microwave assisted recording, and a magnetic recording apparatus.

2. Related Art

In recent years, spin electronics elements, such as TMR (Tunneling Magneto Resistance) heads used as reproduction heads in HDDs (Hard Disk Drives), or spin injection MRAMs (Magnetic Random Access Memories), have made a significant contribution to the progress of information technology. In the course of development of such spin electronics elements, various discoveries have been made, such as the spin torque oscillator that generates microwaves by causing a ferromagnetic material to oscillate by using spin torque, and the spin torque diode effect by which high frequency current is rectified. Thus, an increasing range of possible applications is opening up for high frequency generation, detection, modulation, and amplification, for example. Particularly, the application of the spin torque oscillator in HDDs is gaining much attention as a way of achieving future high recording density. In the following, the related art will be described in greater detail with regard to problems facing the increase in recording density for HDDs and methods for achieving high recording density by solving the problems.

The recording density of HDDs has been increased over the years and the bit size of the recording medium has become increasingly smaller. However, as the bit size becomes smaller, the loss of a recording state due to thermal fluctuation has become an issue of concern. In order to solve the problem and ensure stable maintenance of recording bits at the high density recording of the future, it is necessary to use a recording medium with large coercivity, i.e., large magnetic anisotropy. And in order to record a recording medium with large coercivity, a strong recording magnetic field is required. In practice, however, there is an upper limit to the recording magnetic field intensity due to limitations to the decrease in size of the recording head and the available magnetic materials. For these reasons, the coercivity of the recording medium is restricted by the magnitude of the recording magnetic field that the recording head can generate. In order to address the contradicting demands for high thermal stability of the medium and the coercivity permitting easy recording, a recording technique has been devised whereby the coercivity of the recording medium is effectively lowered only during recording by using various auxiliary measures. A representative example is the thermally assisted recording, by which recording is performed by using a magnetic head and a heating unit, such as a laser, in combination.

According to another idea, recording is performed by using a high-frequency magnetic field in combination with a recording magnetic field from the recording head so that the coercivity of the recording medium can be locally decreased. For example, JP Patent Publication (Kokai) No. 6-243527 A (1994) discusses a technology such that the magnetic recording medium is heated by Joule heating or magnetic resonance by using a high-frequency magnetic field so that information can be recorded by locally decreasing the coercivity of the medium. The recording technique utilizes the magnetic resonance of the high-frequency magnetic field and the magnetic field from the magnetic head. Because the technique (hereafter referred to as "microwave assisted recording") utilizes magnetic resonance, a strong high-frequency magnetic field in proportion to the anisotropic magnetic field of the medium needs to be applied in order to obtain the effect of decreasing the switching magnetic field.

In recent years, the principle of generating a high-frequency magnetic field by using spin torque has been proposed, such as in the form of the spin torque oscillator, making the possibility of microwave assisted recording more realistic. For example, X. Zhu and J. G. Zhu discuss the result of a calculation regarding a spin torque oscillator that oscillates without an external bias magnetic field in "Bias-Field-Free Microwave Oscillator Driven by Perpendicularly Polarized Spin Current", IEEE TRANSACTIONS ON MAGNETICS, P 2670, VOL. 42, NO. 10 (2006). J. G. Zhu and X. Zhu also discuss a technology for recording information in a magnetic recording medium with a large magnetic anisotropy in "Microwave assisted Magnetic Recording", The Magnetic Recording Conference (TMRC) 2007 Paper B6 (2007). According to this technology, a microwave (high-frequency magnetic field) is generated by disposing a magnetization high-speed rotating body or a field generation layer (FGL), in which magnetization is caused to rotate at high speed by spin torque, in the vicinity of a magnetic recording medium adjacent to the main magnetic pole of a perpendicular magnetic recording head. J. Zhu and Y. Wang present a spin torque oscillator such that the rotating direction of the FGL is controlled by utilizing the magnetic field of the main magnetic pole in proximity to the FGL in "Microwave assisted Magnetic Recording with Circular AC Field Generated by Spin Torque Transfer", MMM Conference 2008 Paper GA-02(2008), whereby microwave assisted magnetization reversal of the medium can supposedly be efficiently achieved.

Other related technologies are discussed in JP Patent Publication (Kokai) No. 2009-49101 A and by Mizukami et al., Phy. Rev., B 66, 104413 (2002).

SUMMARY

The characteristics required of a spin torque oscillator for microwave assisted recording presumably include high high-frequency magnetic field intensity, a high oscillation frequency, high spin torque efficiency, and stable oscillation characteristics.

Particularly, in order to obtain a large assist effect, high high-frequency magnetic field intensity is required, and for that purpose the saturated magnetic flux density Bs and film thickness of the FGL need to be increased. Meanwhile, according to a theory by J. C. Slonczewski, JMMM 150, 13-24 (1995), as the Bs and the magnetic layer film thickness are increased, the current density necessary for oscillation increases. However, generally, it is believed that when a current with current density on the order of more than $10^8$ A/cm$^2$ flows, reliability problems are caused by heating and electromigration. Thus, when the Bs and film thickness are increased so as to obtain a high high-frequency magnetic field intensity, methods other than increasing the current density need to be considered in order to achieve high spin torque efficiency at the same time.

From the material viewpoint, the possible methods include a method by which the spin polarization ratio (the degree of alignment of spin orientations) of a magnetic layer is increased, and a method by which damping (spin braking (damping)) is decreased. In order to increase the spin polarization ratio of the magnetic layer, the use of a half-metal (substance with an energy gap due to a large discrepancy between energy bands of respective electrons with up or down spins (ferromagnetic material)) may be considered. Heusler alloys (alloys that exhibit ferromagnetism when respective elements, such as Co and Fe, are arranged regularly) are a representative example of half-metal that exhibits ferromagnetism at room temperature. However, because the Heusler alloys are based on a composition including a non-magnetic metal, the Bs is decreased compared to a high-Bs material consisting of Co, Fe, and Ni.

The method for decreasing the damping of a ferromagnetic material may be based on a magnetic relaxation mechanism of the magnetic layer material itself, or the spin pumping from a material adjacent to the magnetic layer (flow-out of spin current from the magnetic layer to a non-magnetic layer) However, with regard to a high-Bs material consisting of 3d transition elements such as Co, Fe, and Ni, the damping is relatively small in the first place, so that the damping reducing effect by spin pumping is small. Further, depending on the structure of the spin torque oscillator, it may be necessary to add a 5d transition element so as to cause expression of large magnetic anisotropy in the high-frequency magnetic field generation layer. In such a case, damping generally increases due to the influence of large spin orbital interaction. Thus, it is very difficult to increase the high-frequency magnetic field intensity from the material viewpoint.

Another problem is that, in the structure in which the spin torque oscillator is disposed between the main magnetic pole for generating the recording magnetic field and the trailing shield for increasing the magnetic field gradient, as discussed by X. Zhu and J. G. Zhu in the IEEE Transactions, because a strong magnetic field perpendicular to the film plane is applied to the spin torque oscillator, the magnetization of the high-frequency magnetic field generation layer is oriented perpendicularly to the film plane, so that oscillation occurs in a state in which the magnetization is inclined in the direction perpendicular to the film plane. In the structure in which the perpendicular magnetization film is ferromagnetically coupled with the high-frequency magnetic field generation layer, as discussed by X. Zhu and J. G. Zhu in the said publication, both the magnetic field perpendicular to the film plane and a coupling magnetic field from the perpendicular magnetization film cause the magnetization of the high-frequency magnetic field generation layer to be inclined perpendicularly to the film plane. Thus, it is difficult to obtain a strong high-frequency magnetic field in the in-plane direction that is necessary for assist recording.

An object of the present invention is to provide a spin torque oscillator such that the above problems can be solved, a strong high-frequency magnetic field can be stably generated, and high reliability can be obtained.

According to an embodiment, a microwave assisted magnetic recording head includes a main magnetic pole and a spin torque oscillator. A magnetization control layer is antiferromagnetically coupled via a nonmagnetic coupling layer with an interface contacting a high-frequency magnetic field generation layer (oscillation layer) of the spin torque oscillator.

According to the present invention, the intensity of the high-frequency magnetic field generated from the high-frequency magnetic field generation layer can be increased, and stable oscillation can be performed.

BRIEF DESCRIPTION OF DRAWINGS

Other objects, features, and effects will become apparent from the following description when read in conjunction with the attached drawings, in which.

DESCRIPTION

In the following, embodiments of the present invention will be described with reference to the drawings.

First Embodiment

Figure 1:
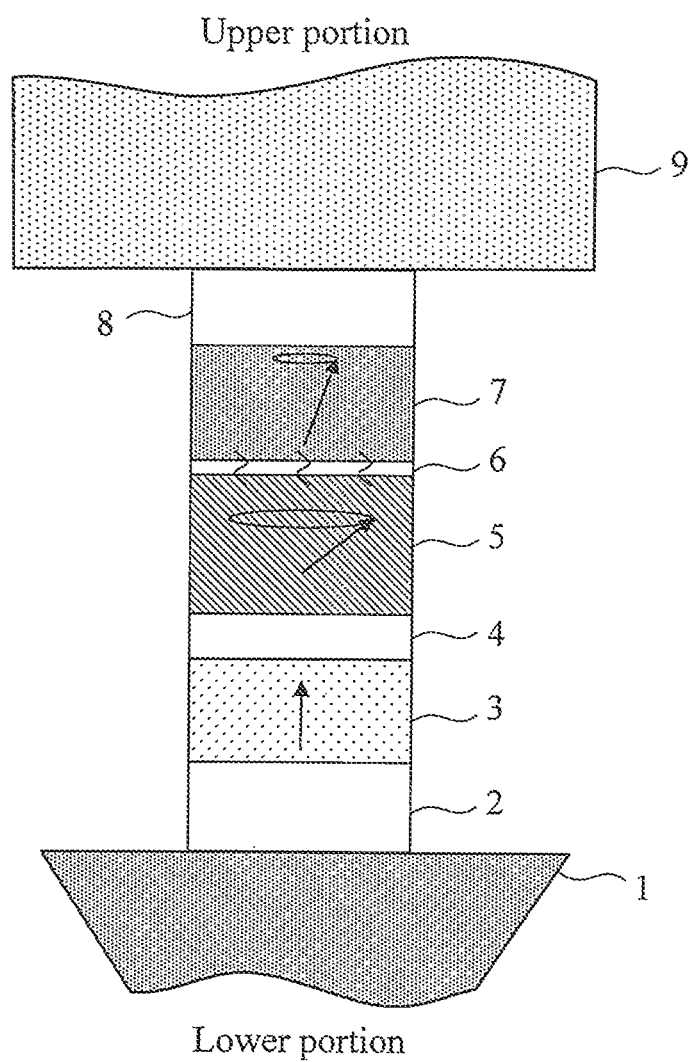
FIG. 1 schematically illustrates an example of a microwave assisted magnetic recording head according to the present invention, illustrating an enlarged view of a spin torque oscillator portion.

FIG. 1 schematically illustrates an example of a microwave assisted magnetic recording head according to a first embodiment of the present invention, illustrating an enlarged view of a spin torque oscillator portion thereof.

As the material for a main magnetic pole 1, CoFeNi with Bs of 2.4 T is used for ensuring high recording magnetic field intensity. A multilayer film of layers from an underlayer 2 to a capping layer 8 is formed at once by sputtering in vacuum. In the following, the material used for the layers will be described in the order of stacking.

For the underlayer 2, any material may be used as long as the material is capable of causing an expression of perpendicular magnetic anisotropy in a spin injection layer 3. According to the present embodiment, Ta(10) is used. The value in the parentheses "( )" indicates the film thickness in units of nanometers. Other possible materials include Cr, Ru, Ir, Cu, and Pt. The thickness of the underlayer 2 needs to be at least 0.5 nm or more in order to suppress the magnetic coupling between the main magnetic pole 1 and the spin injection layer 3 so that the crystalline continuity of the main magnetic pole 1 can be reset. By varying the thickness of the underlayer 2, the distance between the main magnetic pole 1 and a high-frequency magnetic field generation layer (hereafter referred to as "oscillation layer") 5 can be adjusted. In this case, an arrangement in which the superposed magnetic field intensity or gradient of the high-frequency magnetic field from the oscillation layer 5 and the recording magnetic field from the main magnetic pole 1 can most efficiently promote the magnetization reversal of the medium is adopted. Preferably, in order for the superposed magnetic field intensity or gradient to efficiently cause expression of the microwave assisted effect, the thickness of the underlayer 2 may be set to be not more than 20 nm because the efficiency is decreased when the distance between the main magnetic pole 1 and the oscillation layer 5 is too large.

For the spin injection layer 3, a material with high perpendicular magnetic anisotropy needs to be used. According to the present embodiment, an artificial lattice thin film comprising Co(0.2) and Ni(0.4) that are alternately stacked 15 times is used. A perpendicular magnetization film that has been fabricated has a magnetic anisotropy of 16 kOe in a direction perpendicular to the film plane, thus exhibiting sufficiently large anisotropy to withstand magnetic disturbance by spin torque. Other possible materials with perpendicular magnetic anisotropy for the spin injection layer 3 include an alloy with perpendicular magnetic anisotropy comprising a Co/Ni multilayer film with the addition of Pt or Pd as a third element, and a multilayer film of Co/Pt or Co/Pd.

The film thickness of the spin injection layer 3 may be varied within a range such that the magnetic disturbance by spin torque can be withstood. When the perpendicular magnetic anisotropy is 16 kOe, the oscillation characteristics are not affected when the film thickness is decreased to 3 nm. When Co/Pt is used, perpendicular magnetic anisotropy of more than 20 kOe can be expressed, so that the film thickness can be even further decreased. In this case, oscillation has been observed with the film thickness of not less than 1 nm. It may be considered that the greater the film thickness of the spin injection layer 3, the higher the spin torque resistance will be. However, there is the need for the arrangement in which the superposed magnetic field intensity or gradient of the recording magnetic field from the main magnetic pole 1 and the high-frequency magnetic field from the oscillation layer 5 can most efficiently promote the magnetization reversal of the medium, and the efficiency is decreased when the distance between the main magnetic pole 1 and the oscillation layer 5 is too large. Thus, preferably the thickness of the spin injection layer 3 may be set to be not more than 20 nm.

For a spin conduction layer 4 stacked thereon, a material with long spin diffusion length may be used. According to the present embodiment, Cu(2) is used. Other possible materials include metals such as Au and Ag. When a metal material is used, the film thickness may be decreased as long as the spin injection layer 3 and the oscillation layer 5 are ferromagnetically coupled and exhibit a unified magnetization behavior. The magnetic coupling can be sufficiently decreased when the film thickness is not less than 0.5 nm. While it is possible to increase the film thickness within the range of the spin diffusion length for each material, the film thickness may be minimized, preferably to not more than 5 nm, to maximize spin injection efficiency.

It is also possible to configure the spin torque oscillator utilizing TMR. In this case, as the spin conduction layer 4, it is preferable to form an insulating layer of Al—O, Mg—O, or Zn—O, for example, from which a large spin-dependent tunneling phenomenon can be expected. When the insulating layer is used as the spin conduction layer 4, the element resistance increases exponentially as the film thickness is increased. Thus, from the viewpoint of increasing spin injection efficiency with a large current density, the film thickness may be minimized, such as in a range of 0.4 nm, which is the minimum film thickness for providing the insulating layer function, to 2 nm.

On top of the spin conduction layer 4, the oscillation layer 5 of $Co_{50}Fe_{50}(12)$ is formed. The subscript of the materials denotes the composition of the material by at %. As the material for the oscillation layer 5, compositions or materials other than $Co_{50}Fe_{50}$ may be used to form a relatively high-Bs layer. For example, Co, Fe, or Ni or an alloy thereof, a Heusler alloy such as Co—Fe—Ge, Co—Mn—Ge, Co—Fe—Al, Co—Fe—Si, Co—Mn—Si, or Co—Fe—Si as a high spin injection efficiency material, and Co, Fe, or Ni or an alloy thereof may be stacked to provide a structure that satisfies both high-Bs and high spin polarization ratio. Further, a material that exhibits negative perpendicular anisotropy, such as Co/Fe or Co/Ir, may be used. In order to increase the high-frequency magnetic field intensity, the Bs and film thickness of the oscillation layer 5 should be increased. However, as the film thickness is increased, the current density necessary for oscillation is increased and the antimagnetic field in the film thickness direction is also decreased, so that the oscillation layer magnetization tends to be oriented in the direction perpendicular to the film plane. Accordingly, in order to obtain the maximum high-frequency magnetic field intensity, it is important to achieve a proper balance among the spin injection efficiency, the antimagnetic field, and the intensity of the magnetic field penetrating from the main magnetic pole 1 to the trailing shield 9. Thus, in view of such balance, the film thickness of the oscillation layer 5 may preferably be in a range of 3 nm to 20 nm.

As a non-magnetic coupling layer 6 stacked further thereon, Ru(0.4) is used according to the present embodiment. When Ru is used, the maximum antiparallel coupling strength is obtained when the film thickness is 0.4 nm, with the coupling strength of 4 erg/cm². For the non-magnetic coupling layer 6, other materials by which antiferromagnetic coupling can be caused between the oscillation layer 5 and the magnetization control layer 7 may be used, such as a Ru—Fe alloy. When Ru—Fe is used, it is known that the optimum film thickness at which antiparallel coupling can be obtained is displaced toward the greater film thickness side by approximately 0.1 to 0.2 nm compared with the case of Ru.

For the film thickness of the non-magnetic coupling layer 6, an arbitrary film thickness may be selected to the extent that the oscillation layer 5 and the magnetization control layer 7 can be antiferromagnetically coupled via the non-magnetic coupling layer 6. The antiferromagnetic coupling strength is determined by the film thickness of the non-magnetic coupling layer 6 and an RKKY interaction (interaction between localized spins that occurs via the spin of conduction electrons in a metal). Thus, other than the film thickness of 0.4 nm for Ru used in the present embodiment, it is also possible to use a greater film thickness at which antiparallel coupling can be obtained, such as 0.8 nm. However, when the film thickness exceeds 2 nm, it is difficult to obtain a sufficiently strong antiparallel coupling strength, so that preferably the Ru or Ru—Fe film may be stacked within the film thickness range of 0.2 nm to 2.0 nm.

For the magnetization control layer 7 stacked thereon, a material with perpendicular magnetic anisotropy is preferably used. According to the present embodiment, an artificial lattice thin film comprising Co(0.2) and Ni(0.4) that are alternately stacked 10 times is used. The magnetization control layer 7 according to the present embodiment has magnetic anisotropy of 14 kOe, and the magnetization is oriented perpendicularly to the film plane even in the absence of an external magnetic field. However, the effect of the present embodiment is not changed if the magnetization control layer 7 is such that the perpendicular magnetic anisotropy is weaker than the antimagnetic field and the magnetization is oriented in the film plane direction. Other materials with perpendicular magnetic anisotropy that may be used for the magnetization control layer 7 include an alloy with perpendicular magnetic anisotropy comprising a Co/Ni multilayer film with the addition of Pt or Pd as a third element, and a multilayer film of Co/Pt or Co/Pd.

For the capping layer 8 stacked further thereon, Ru(3) is used according to the present embodiment. The capping layer 8 is required to block magnetic coupling with the trailing shield 9 located above and also to prevent milling damage during processing. Materials other than Ru(3) that satisfy such purposes may include Cr, Ti, Pt, Rh, Pd, and Ta.

While the trailing shield 9 is required for making the magnetic field gradient of the main magnetic pole 1 steep, the trailing shield 9 may not be necessarily required when the high-frequency magnetic field intensity of the spin torque oscillator is sufficiently high.

Electrons injected from the trailing shield 9 through the capping layer 8, the magnetization control layer 7, the non-magnetic coupling layer 6, the oscillation layer 5, the spin conduction layer 4, the spin injection layer 3, the underlayer 2, and the main magnetic pole 1 are reflected by an interface between the spin conduction layer 4 and the spin injection layer 3, and the reflected electrons provide a spin torque to the oscillation layer 5. By the reflection on the interface, the spin torque supplied to the oscillation layer 5 would cause an alignment antiparallel with the magnetization of the spin injection layer 3 by spin interaction with the magnetization of the spin injection layer 3 indicated by an arrow in FIG. 1. In a state in which the spin torque and a damping torque are balanced, oscillation occurs. The magnitude of the damping torque is determined by the magnetic anisotropy of the oscillation layer 5 in a direction perpendicular to the film plane, and the sum of the coupling magnetic field from the magnetization control layer 7 magnetically Coupled via the non-magnetic coupling layer 6, and the gap magnetic field passing from the main magnetic pole 1 to the trailing shield 9.

Figure 2:
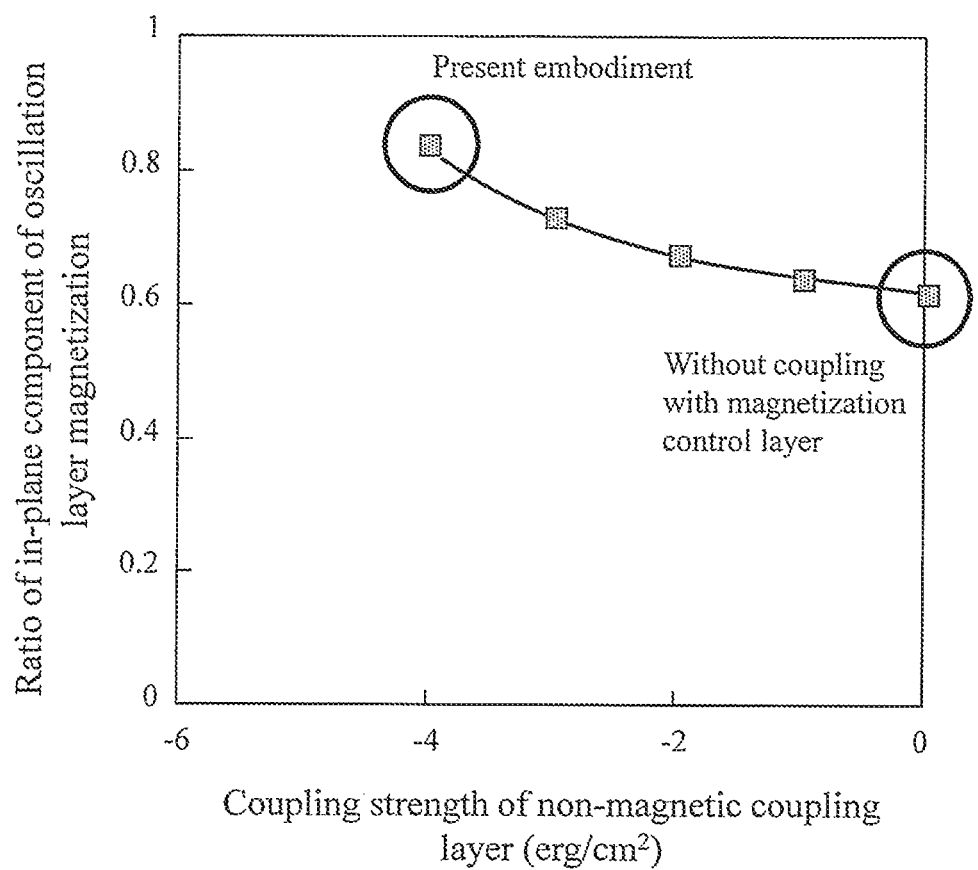
FIG. 2 illustrates the ratio of the in-plane component of the oscillation layer magnetization obtained by a structure according to the first embodiment.

FIG. 2 illustrates the result of a micromagnetic simulation of oscillation characteristics conducted by using material parameters according to the present embodiment. The simulation model included a square element measuring 40 nm in width and 40 nm in height for which the film thickness, saturated magnetic flux density, and magnetic anisotropy of the respective layers that were actually fabricated were set, and electrons were caused to flow from the oscillation layer 5 to the spin injection layer 3. In the simulation model, the time average of the projection of the magnetization of the oscillation layer oscillating while inclined in the direction perpendicular to the film plane on the in-plane direction was considered the ratio of the in-plane component of the oscillation magnetization. It is seen from FIG. 2 that, compared to the case where there is no magnetic coupling between the magnetization control layer 7 and the oscillation layer 5, the ratio of the in-plane component of the oscillation layer magnetization is increased when there is antiferromagnetic coupling via the non-magnetic coupling layer 6 (the coupling strength with the negative sign indicates antiferromagnetic coupling).

According to FIG. 2, the ratio of the in-plane magnetization component of the oscillation layer 5 is increased when there is antiferromagnetic coupling at least between the oscillation layer 5 and the magnetization control layer 7, compared to when there is no such coupling. Thus, while the effect of the present embodiment is obtained irrespective of the antiferromagnetic coupling strength, the effect can be increased particularly when there is strong antiferromagnetic coupling strength, such as −4 erg/cm² according to the present embodiment, whereby the in-plane component ratio of the oscillation layer magnetization can be increased by 25% compared to the case where there is no such coupling.

There is also the advantage that, when there is antiferromagnetic coupling between the oscillation layer 5 and the magnetization control layer 7 via the non-magnetic coupling layer 6, the inclined magnetic field resistance before oscillation is stopped can be increased in the event that an external magnetic field is applied at an angle, compared to the case where there is no such coupling. In FIG. 1, the magnetic field applied from the main magnetic pole 1 toward the trailing shield tends to be easily applied in a direction inclined toward the direction perpendicular to the film plane from the plane of the drawing sheet, due to the three-dimensional shape of the main magnetic pole 1 or the trailing shield 9 and interaction with the medium. Table 1 illustrates whether the spin torque oscillator oscillates when the magnetic field is inclined from the plane of the drawing sheet toward the direction perpendicular to the film plane by angles θ of 0° to 40°.

TABLE 1

| Coupling strength of non-magnetic coupling layer (erg/cm²) | Magnetic field angle θ (degree) | | | | |
|---|---|---|---|---|---|
| | 0 | 10 | 20 | 30 | 40 |
| 0 | ◯ | ◯ | X | X | X |
| −2 | ◯ | ◯ | ◯ | ◯ | X |
| −4 | ◯ | ◯ | ◯ | ◯ | ◯ |

◯: Oscillated
X: Did not oscillate

As will be seen from Table 1, when there is no antiferromagnetic, coupling between the oscillation layer 5 and the magnetization control layer 7 (when the coupling strength is 0 erg/cm² in Table 1), there is no oscillation when θ=20° or more. However, oscillation continues up to θ=30° when the coupling strength is −2 erg/cm² and up to θ=40° when the coupling strength is −4 erg/cm². Thus, in view of the oscillation yield of the actual head, a spin torque oscillator that is robust against the shape or shape variations of the main magnetic pole 1 or the trailing shield 9 can be formed by antiferromagnetically coupling the oscillation layer 5 and the magnetization control layer 7.

While in the above example the calculations were made regarding the element with the width of 40 nm and the height of 40 nm as the simulation model, the effect of the present embodiment is not limited by the particular size and shape. Even when the width and height are increased to the order of 100 nm, or for a rectangular element with different width and height, the high-frequency magnetic field intensity of the oscillation layer 5 can be increased when the magnetization control layer 7 is coupled in an antiparallel manner via the non-magnetic coupling layer 6 as long as the element can produce spin torque oscillation.

Second Embodiment

Figure 3:
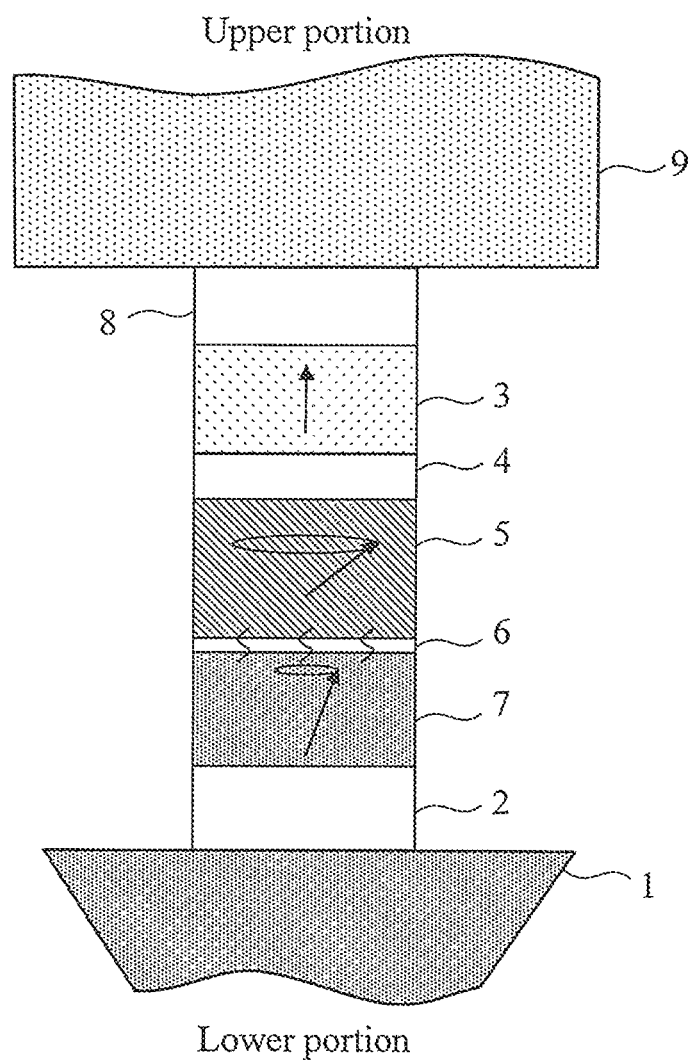
FIG. 3 schematically illustrates another example of the microwave assisted magnetic recording head according to the present invention, illustrating an enlarged view of the spin torque oscillator portion.

FIG. 3 schematically illustrates another example of the microwave assisted magnetic recording head according to a second embodiment of the present invention, illustrating an enlarged view of the spin torque oscillator portion. The structure of the spin torque oscillator according to the present embodiment is such that the layers disposed between the main magnetic pole 1 and the trailing shield 9 are stacked in the opposite order from the first embodiment illustrated in FIG. 1. As illustrated in FIG. 3, by reversing the order of the stacked layers, the distance between the main magnetic pole 1 and the oscillation layer 5 can be adjusted more easily.

Generally, there is an optimum value for the distance between the main magnetic pole 1 and the oscillation layer 5 depending on the property of the recording medium or conditions of use.

In the configuration according to the present embodiment, the multilayer film between the underlayer 2 and the capping layer 8 is formed at once by sputtering in vacuum. In the following, the material used for the layers will be described in the order of stacking.

The underlayer 2 may comprise any material that causes expression of perpendicular magnetic anisotropy of the magnetization control layer 7. According to the present embodiment, Ta(10) is used. Other possible materials include Cr, Ru, Ir, Cu, and Pt. The underlayer 2 needs to have a film thickness such that the underlayer 2 can function as a base for inducing perpendicular magnetic anisotropy in the magnetization control layer 7 formed thereon, and such that the magnetic coupling between the main magnetic pole 1 and the magnetization control layer 7 can be cut. There is also the need for the arrangement in which the superposed magnetic field intensity or gradient of the recording magnetic field from the main magnetic pole 1 and the high-frequency magnetic field from the oscillation layer 5 can most efficiently prompt the magnetization reversal of the medium. If the distance between the main magnetic pole 1 and the oscillation layer 5 is too large, efficiency is lowered. Thus, preferably, the thickness of the underlayer 2 is set to be not more than 20 nm. The material, film thickness, and configuration of the layers from the magnetization control layer 7 to the capping layer 8 stacked on the underlayer 2 may be the same as those described with reference to the first embodiment, and thus their detailed description is omitted.

The magnetization control layer 7 formed according to the present embodiment has perpendicular magnetic anisotropy of 17 kOe, which is larger than the corresponding value of the magnetization control layer 7 according to the first embodiment. This means that, compared to the first embodiment, the magnetization control layer 7 on the Ta(10) is in a state such that the perpendicular magnetic anisotropy can be more readily expressed. Thus, according to the configuration of the present embodiment, the degree of selection of the material and film thickness of the underlayer 2 is high, so that the perpendicular magnetic anisotropy of the magnetization control layer 7 can be increased.

According to the present embodiment, the direction of current for an operation is reversed from the direction according to the first embodiment. Electrons injected from the main magnetic pole 1 through the underlayer 2, the magnetization control layer 7, the non-magnetic coupling layer 6, the oscillation layer 5, the spin conduction layer 4, the spin injection layer 3, the capping layer 8, and the trailing shield 9 are reflected at the interface between the spin conduction layer 4 and the spin injection layer 3, the reflected electrons providing a spin torque to the oscillation layer 5. By the reflection at the interface, the torque supplied to the oscillation layer 5 would cause an alignment antiparallel with the magnetization of the spin injection layer 3 by spin interaction with the magnetization of the spin injection layer 3 indicated by an arrow in FIG. 3. In a state in which the spin torque and a damping torque are balanced, oscillation occurs. The magnitude of the damping torque is determined by the magnetic anisotropy of the oscillation layer 5 in a direction perpendicular to the film plane and the sum of the coupling magnetic field from the magnetization control layer 7 magnetically coupled via the non-magnetic coupling layer 6 and the gap magnetic field passing from the main magnetic pole 1 to the trailing shield 9.

Figure 4:
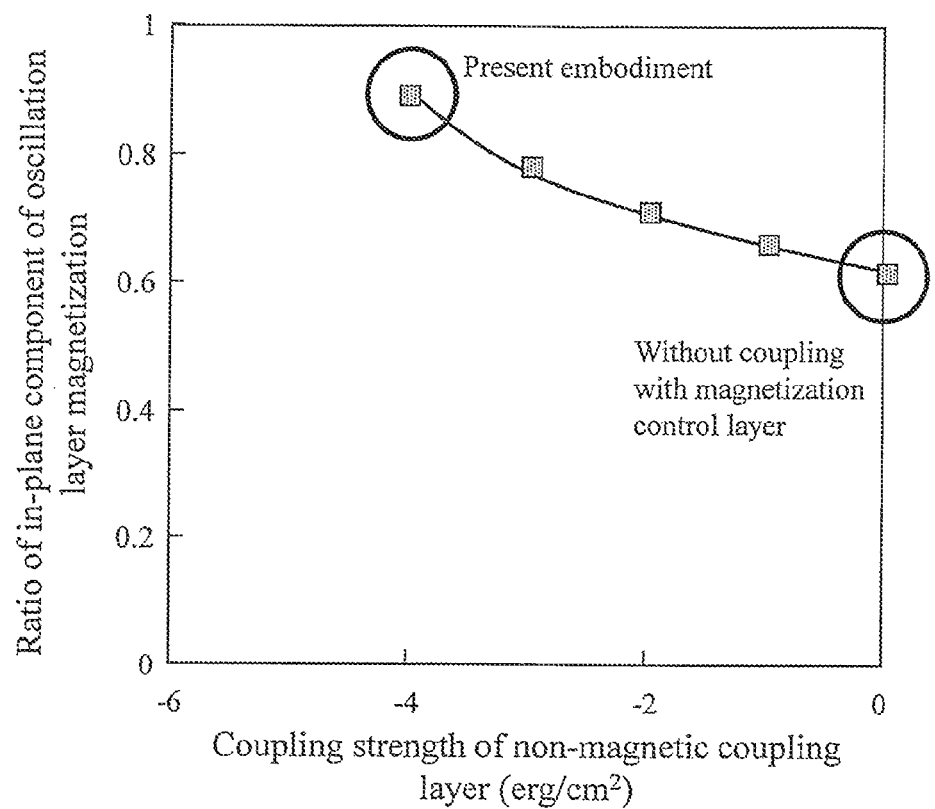
FIG. 4 illustrates the ratio of the in-plane component of the oscillation layer magnetization obtained by a structure according to the second embodiment.

FIG. 4 illustrates the result of a micromagnetic simulation of oscillation characteristics conducted by using material parameters according to the present embodiment. The simulation model included a square element measuring 40 nm in width and 40 nm in height for which the film thickness, saturated magnetic flux density, and magnetic anisotropy of the respective layers that were actually fabricated were set, and electrons were caused to flow from the oscillation layer 5 to the spin injection layer 3. The time average of the projection of the magnetization of the oscillation layer 5 oscillating while inclined in the direction perpendicular to the film plane on the in-plane direction was considered the in-plane component ratio of the oscillation magnetization.

It is seen from FIG. 4 that, compared with the case in which there is no magnetic coupling between the magnetization control layer 7 and the oscillation layer 5, the in-plane component ratio of the oscillation layer magnetization is increased when there is antiferromagnetic coupling via the non-magnetic coupling layer 6 (the negative sign of the coupling strength indicates antiferromagnetic coupling). According to FIG. 4, when there is antiferromagnetic coupling between at least the oscillation layer 5 and the magnetization control layer 7, the ratio of the in-plane magnetization component of the oscillation layer 5 is increased compared to the case where there is no such coupling. Thus, the effect of the present embodiment is obtained irrespective of the antiferromagnetic coupling strength. Compared with the configuration according to the first embodiment, the in-plane component ratio of the magnetization of the oscillation layer 5 is further increased when the coupling strength of the non-magnetic coupling layer 6 is large because of the influence of the increase of the magnetic anisotropy of the magnetization control layer 7 from 14 kOe to 17 kOe.

The structure according to the present embodiment also provides the advantage that, when there is antiferromagnetic coupling between the oscillation layer 5 and the magnetization control layer 7 via the non-magnetic coupling layer 6, the inclined magnetic field resistance before oscillation stops upon application of an external magnetic field at an angle can be increased, compared with the case in which there is no such coupling. Calculation of the oscillation resistance against the inclined magnetic field, has indicated the same result for the configuration of the present embodiment as the result shown in Table 1 described with reference to the first embodiment.

While the calculation was made in the above example regarding the element with the width of 40 nm and the height of 40 nm as the simulation model, the effect of the present embodiment is not limited to the particular size and shape. Even when the width and height is increased to the order of 100 nm, or for a rectangular element with different width and height, the high-frequency magnetic field intensity of the oscillation layer 5 can be increased when the magnetization control layer 7 is coupled in an antiparallel manner via the non-magnetic coupling layer 6 as long as the element can produce spin torque oscillation.

Third Embodiment

Figure 5:
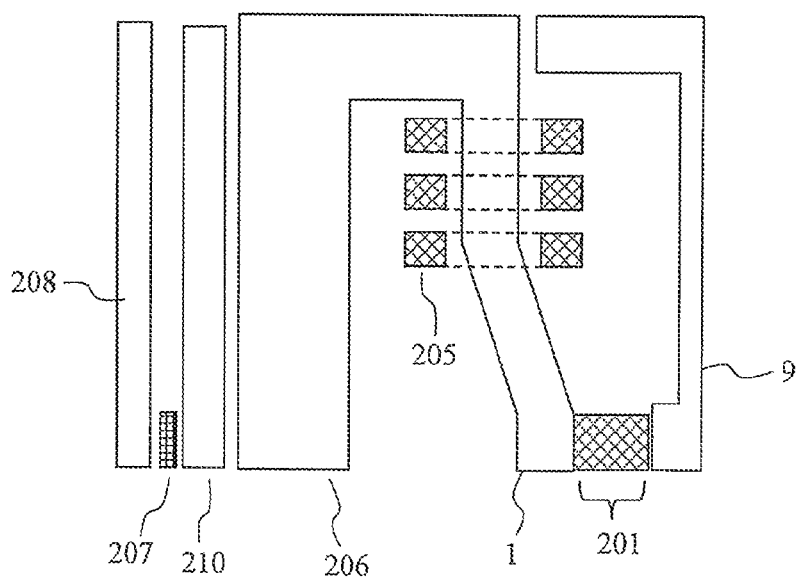
FIG. 5 schematically illustrates an example of a magnetic head including a spin torque oscillator.

FIG. 5 is an enlarged cross sectional view of a magnetic head including the spin torque oscillator described with reference to the first or second embodiment.

The magnetic head includes a recording head unit and a reproduction head unit. The recording head unit includes an auxiliary magnetic pole 206, a spin torque oscillator 201 disposed between the main magnetic pole 1 and the trailing shield 9, and coils 205 that excites the main magnetic pole. A recording magnetic field is generated from the main magnetic pole 1. The reproduction head unit includes a reproduction sensor 207 disposed between a lower shield 208 and an upper shield 210. While not illustrated, a coil excitation current, a reproduction sensor drive current, and a current applied to a high-frequency magnetic field generating element are supplied via current supply terminals provided for the respective constituent elements.

As illustrated in FIG. 5, the trailing shield 9 extends toward the main magnetic pole 1 at the top of the element in the height direction thereof, mutually forming a magnetic circuit. The trailing shield 9 and the main magnetic pole 1 are electrically insulated from each other at the top of the element in the height direction. Thus, a series electric circuit is formed from the main magnetic pole 1 to the trailing shield 9 via the spin torque oscillator 201. Accordingly, by connecting electrodes to the main magnetic pole 1 and the trailing shield 9, a current necessary for spin torque oscillation can be caused to flow to the spin torque oscillator 201.

Fourth Embodiment

Figure 6A:
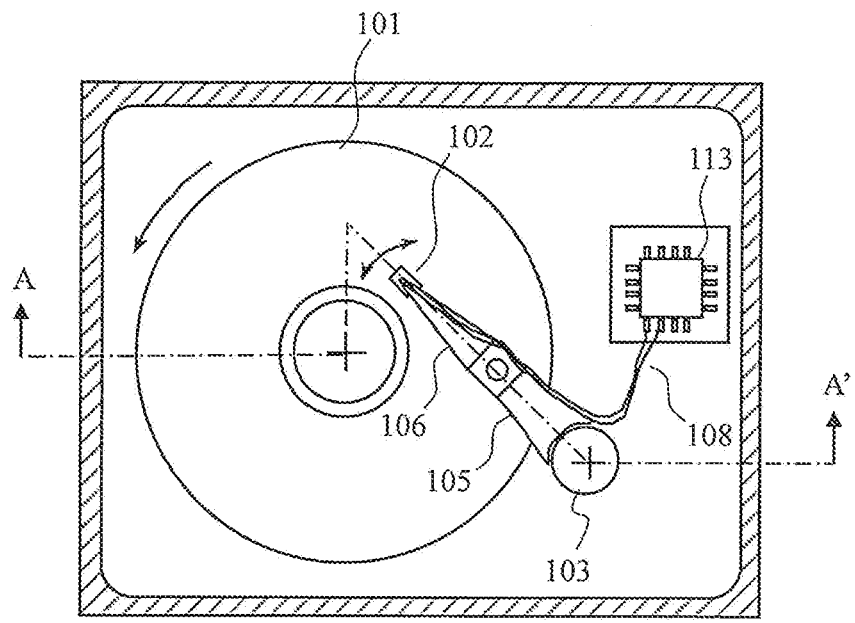
FIG. 6A is a schematic top plan view illustrating an overall configuration of a magnetic recording and reproduction apparatus.
Figure 6B:
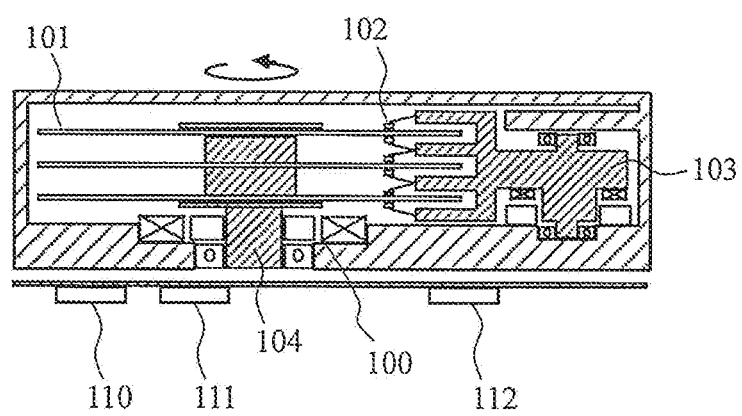
FIG. 6B is a cross sectional view taken along line A-A' of FIG. 6A.

According to a fourth embodiment of the present invention, a magnetic recording and reproduction apparatus includes the magnetic head according to the third embodiment and a magnetic recording medium. FIG. 6A is a schematic top plan view illustrating an overall configuration of the magnetic recording and reproduction apparatus according to the present embodiment. FIG. 6B is a cross sectional view taken along line A-A of FIG. 6A.

The magnetic recording medium (magnetic disk) 101 is mounted on a rotary bearing 104 and rotated by a motor 100. While the example illustrated in FIG. 6B includes three magnetic disks and six magnetic heads, one or more magnetic disks and one or more magnetic heads may be used. The magnetic recording medium 101 is a disk with recording layers formed on both sides thereof. A slider 102 is moved over the surface of the rotating recording medium in a substantially radial direction and includes the magnetic heads disposed at the end. A suspension 106 is supported by a rotary actuator 103 via an arm 105. The suspension 106 has the function of pressing the slider 102 onto the magnetic recording medium 101 with a predetermined load, or separating the slider 102 from the magnetic recording medium 101. By actuating the arm 105 with the rotary actuator 103, the magnetic heads mounted on the slider 102 can be positioned over a desired track on the magnetic recording medium 101.

Currents for driving the respective constituent elements of the magnetic heads are supplied from an IC amplifier 113 via wires 108. A recording signal supplied to the recording head unit or a reproduction signal detected from the reproduction head unit are processed by a read/write channel IC 112. An overall control operation for the magnetic recording and reproduction apparatus is implemented by a processor 110 executing a disk control program stored in a memory 111. Thus, according to the present embodiment, the processor 110 and the memory 111 constitute a so-called disk controller.

With regard to the above configuration, the magnetic head according to the present invention and the magnetic recording and reproduction apparatus equipped with the same were tested, and the result indicated a sufficient output and a high recording density with high operation reliability.

The present invention is not limited to the foregoing embodiments and may include various modifications. For example, the foregoing embodiments have been set forth in order to provide a thorough understanding of the present invention and are not necessarily limited to the specific details described above. Some elements of the configuration of one embodiment may be substituted with the elements of the configuration of another embodiment, or the elements of the configuration of the other embodiment may be added to the elements of the configuration of the one embodiment. Some elements of the configuration of each embodiment may be modified by addition, deletion, or substitution on the basis of another configuration.

REFERENCE SIGNS LIST

1 Main magnetic pole
2 Underlayer
3 Spin injection layer
4 Spin conduction layer
5 High-frequency magnetic field generation layer (oscillation layer)
6 Non-magnetic coupling layer
7 Magnetization control layer
8 Capping layer
9 Trailing shield
100 Motor
101 Recording medium
102 Slider
103 Rotary actuator
104 Rotary bearing
105 Arm
106 Suspension
108 Wires
110 Processor
111 Memory
112 Channel IC
113 IC amplifier
201 Spin torque oscillator
205 Coil
206 Auxiliary magnetic pole
207 Reproduction sensor
208 Lower shield
210 Upper shield

The invention claimed is:

1. A microwave assisted magnetic recording head comprising:
   a main magnetic pole; and
   a spin torque oscillator,
   wherein the spin torque oscillator includes a high-frequency magnetic field generation layer antiferromagnetically coupled with a magnetization control layer via a non-magnetic coupling layer;
   wherein the spin torque oscillator having a multilayer film structure is stacked on the main magnetic pole in a film thickness direction,
   wherein the spin torque oscillator includes an underlayer, a spin injection layer, a spin conduction layer, the high-frequency magnetic field generation layer, the non-magnetic coupling layer, the magnetization control layer, and a capping layer which are stacked on the main magnetic pole in the recited order.

2. The microwave assisted magnetic recording head according to claim 1, wherein the magnetization control layer is a perpendicular magnetic anisotropy film with a magnetic easy axis in a direction perpendicular to a film plane.

3. The microwave assisted magnetic recording head according to claim 1, wherein the non-magnetic coupling layer includes at least one material selected from Ru and Ru—Fe.

4. The microwave assisted magnetic recording head according to claim 1, wherein the magnetization control layer is a multilayer film of Co and Ni.

5. A microwave assisted magnetic recording head comprising:
- a main magnetic pole; and
- a spin torque oscillator,
- wherein the spin torque oscillator includes a high-frequency magnetic field generation layer antiferromagnetically coupled with a magnetization control layer via a non-magnetic coupling layer;
- wherein the spin torque oscillator having a multilayer film structure is stacked on the main magnetic pole in a film thickness direction,
- wherein the spin torque oscillator includes an underlayer, the magnetization control layer, the non-magnetic coupling layer, the high-frequency magnetic field generation layer, a spin conduction layer, a spin injection layer, and a capping layer which are stacked on the main magnetic pole in the recited order.

6. The microwave assisted magnetic recording head according to claim 5, wherein the magnetization control layer is a perpendicular magnetic anisotropy film with a magnetic easy axis in a direction perpendicular to a film plane.

7. The microwave assisted magnetic recording head according to claim 5, wherein the non-magnetic coupling layer includes at least one material selected from Ru and Ru—Fe.

8. The microwave assisted magnetic recording head according to claim 5, wherein the magnetization control layer is a multilayer film of Co and Ni.

* * * * *